(12) United States Patent
Lee et al.

(10) Patent No.: US 11,075,426 B2
(45) Date of Patent: Jul. 27, 2021

(54) BATTERY PACK

(71) Applicant: SK Innovation Co., Ltd., Seoul (KR)

(72) Inventors: Ji Seok Lee, Sejong (KR); Hyun Soo Kim, Daejeon (KR); Hyun Jin Kim, Daejeon (KR); Gil Jae You, Daejeon (KR); Dong Joo Lim, Anyang-si (KR)

(73) Assignee: SK Innovation Co., Lt.d, Seoul (KR)

( * ) Notice: Subject to any disclaimer, the term of this patent is extended or adjusted under 35 U.S.C. 154(b) by 0 days.

(21) Appl. No.: 14/406,490

(22) PCT Filed: May 31, 2013

(86) PCT No.: PCT/KR2013/004788
§ 371 (c)(1),
(2) Date: Dec. 8, 2014

(87) PCT Pub. No.: WO2013/183889
PCT Pub. Date: Dec. 12, 2013

(65) Prior Publication Data
US 2015/0140375 A1 May 21, 2015

(30) Foreign Application Priority Data
Jun. 8, 2012 (KR) .................. 10-2012-0061630

(51) Int. Cl.
*H01M 50/317* (2021.01)
*H01M 10/63* (2014.01)
(Continued)

(52) U.S. Cl.
CPC .......... *H01M 50/317* (2021.01); *B60L 50/64* (2019.02); *B60L 50/66* (2019.02); *B60L 58/26* (2019.02); *B60L 58/27* (2019.02); *H01M 10/615* (2015.04); *H01M 10/63* (2015.04); *H01M 10/6562* (2015.04); *H01M 10/6565* (2015.04); *B60L 2240/545* (2013.01);
(Continued)

(58) Field of Classification Search
CPC ............ H01M 6/5038; H01M 10/613; H01M 10/6562; H01M 10/63; H01M 10/625; H01M 2/1077; H01M 2222/20; B60L 11/613
See application file for complete search history.

(56) References Cited

U.S. PATENT DOCUMENTS

| | | | | |
|---|---|---|---|---|
| 6,613,472 B1* | 9/2003 | Watanabe | ........... | H01M 10/625 429/112 |
| 7,025,159 B2* | 4/2006 | Smith | ............... | B60H 1/00278 180/68.1 |
| 2006/0036883 A1* | 2/2006 | Hashizumi | .......... | H01M 10/486 713/300 |
| 2010/0112419 A1 | 5/2010 | Jang et al. | | |
| 2011/0256432 A1* | 10/2011 | TenHouten | ......... | H01M 2/1072 429/50 |

(Continued)

FOREIGN PATENT DOCUMENTS

CN  1358338 A   7/2002
CN  101652896 A  2/2010
(Continued)

*Primary Examiner* — Ula C Ruddock
*Assistant Examiner* — Thomas H. Parsons
(74) *Attorney, Agent, or Firm* — The Webb Law Firm

(57) ABSTRACT

Provided is a battery pack, and more particularly, a battery pack capable of preventing degradation of performance at a low temperature by allowing a portion of air exhausted through an exhaust port to be introduced into an inhalation port to optimize a temperature of external air introduced into a cell module.

9 Claims, 3 Drawing Sheets

(51) Int. Cl.
| | |
|---|---|
| *H01M 10/6565* | (2014.01) |
| *H01M 10/6562* | (2014.01) |
| *B60L 58/26* | (2019.01) |
| *B60L 58/27* | (2019.01) |
| *B60L 50/60* | (2019.01) |
| *B60L 50/64* | (2019.01) |
| *H01M 10/615* | (2014.01) |
| *H01M 10/625* | (2014.01) |
| *H01M 50/20* | (2021.01) |

(52) U.S. Cl.
CPC .......... *H01M 10/625* (2015.04); *H01M 50/20* (2021.01); *H01M 2220/20* (2013.01); *Y02T 10/70* (2013.01)

(56) References Cited

U.S. PATENT DOCUMENTS

2011/0262791 A1* 10/2011 Im ..................... H01M 2/1077
429/120
2011/0318627 A1  12/2011 Fujiwara et al.

FOREIGN PATENT DOCUMENTS

| DE | 102004021280 | * | 6/2005 |
|---|---|---|---|
| DE | 102004021280 B3 | * | 6/2005 |
| JP | 2007012486 A | | 1/2007 |
| JP | 2008265466 A | | 11/2008 |
| JP | 2009009888 A | | 1/2009 |
| JP | 2009252730 A | | 10/2009 |
| JP | 2010149647 A | | 7/2010 |
| KR | 1020050120260 A | | 12/2005 |
| KR | 1020100059083 A | | 6/2010 |
| KR | 1020110048978 A | | 5/2011 |

* cited by examiner (A)

(B)

BATTERY PACK

CROSS-REFERENCE TO RELATED APPLICATIONS

This application is the United States national phase of International Application No. PCT/KR2013/004,788 filed May 31, 2013, and claims priority to Korean Patent Application No. 10-2012-0061630 filed Jun. 8, 2012, the disclosures of which are hereby incorporated in their entirety by reference.

TECHNICAL FIELD

The present invention relates to a battery pack, and more particularly, to a battery pack capable of preventing degradation of performance of a cell module due to a low temperature of external air which is inhaled by allowing a portion of air which is exhausted to be introduced into an inhalation port to optimize a temperature Ta of the inhaled external air.

BACKGROUND ART

Generally, a vehicle using an internal combustion engine using gasoline or heavy oil as main fuel has a serious effect on occurrence of pollution such as air pollution, and the like. Recently, in order to reduce the occurrence of pollution, an electric vehicle or a hybrid electric vehicle has been actively developed. In this case, as a power source for the electric vehicle or the hybrid electric vehicle, a battery is used. Recently, a high output secondary battery using a non-aqueous electrolyte with a high energy density has been developed. A device requiring large power such as a motor driving of the electric vehicle, and the like, generally uses a large capacity battery pack configured by connecting a plurality of high output secondary batteries with each other in series.

As described above, the large capacity battery pack is generally configured to include a plurality of secondary batteries that are connected to each other in series. Particularly, in the case of a battery pack for HEV, as several secondary batteries to several ten secondary batteries alternately perform charging and discharging, there is a need to manage the batteries so as to be maintained at a proper operational state by controlling the charging, discharging, or the like.

In addition, since high heat that occurs during a charging and discharging process of the battery pack influences performance and lifespan of the battery, it is required to cool the battery pack by configuring a proper cooling system.

However, the case of the battery pack configured by the secondary batteries may have low performance at a low temperature. Particularly, in the case in which the temperature falls below zero, since the performance of the battery pack is decreased to 50% or less of the performance shown at room temperature, startup degradation, or the like may be caused in a vehicle including the battery pack.

Therefore, a secondary battery capable of dissipating heat of a battery cell at a proper temperature has been demanded.

The related art associated with those described above is disclosed in Korean Patent Laid-Open Publication No. 2005-0120260.

DISCLOSURE

Technical Problem

An object of the present invention is to provide a battery pack capable of preventing degradation of performance of a battery pack due to a low temperature of external air which is inhaled by optimizing a temperature Ta of the external air inhaled to cool a cell module.

Technical Solution

In one general aspect, a battery pack includes: a case having an inhalation port and an exhaust port formed therein, cooling air being inhaled or exhausted into or from the inhalation port or the exhaust port; a cell module included in the case and configured by arranging a plurality of battery cells in parallel to each other while having a predetermined distance; an inhalation duct having one side connected to the inhalation port and the other side opened toward the cell module side; an exhaust duct having one side connected to the exhaust port and the other side opened toward the cell module side; and a circulation flow path connecting the inhalation duct and the exhaust duct to each other.

The circulation flow path may have one side connected to one side of the inhalation duct and the other side connected the entire exhaust port.

The battery pack may further include an opening and closing valve on the circulation flow path.

The battery pack may further include a controlling part controlling the opening and closing valve.

The controlling part may not open the opening and closing valve if a difference between a temperature of the cell module and a temperature of external air which is inhaled into the inhalation port is less than 10° C.

The controlling part may open the opening and closing valve if a difference between a temperature of the cell module and a temperature of external air which is inhaled into the inhalation port exceeds 20° C.

The controlling part may gradually open the opening and closing valve by 10%.

Advantageous Effects

According to the present invention, the battery pack may prevent the degradation of the performance of the battery pack due to the low temperature of air which is inhaled by optimizing the temperature of air inhaled into the inhalation port.

BEST MODE

Hereinafter, a battery pack 1000 according to an exemplary embodiment of the present invention as described above will be described in detail with reference to the accompanying drawings.

Figure 1:
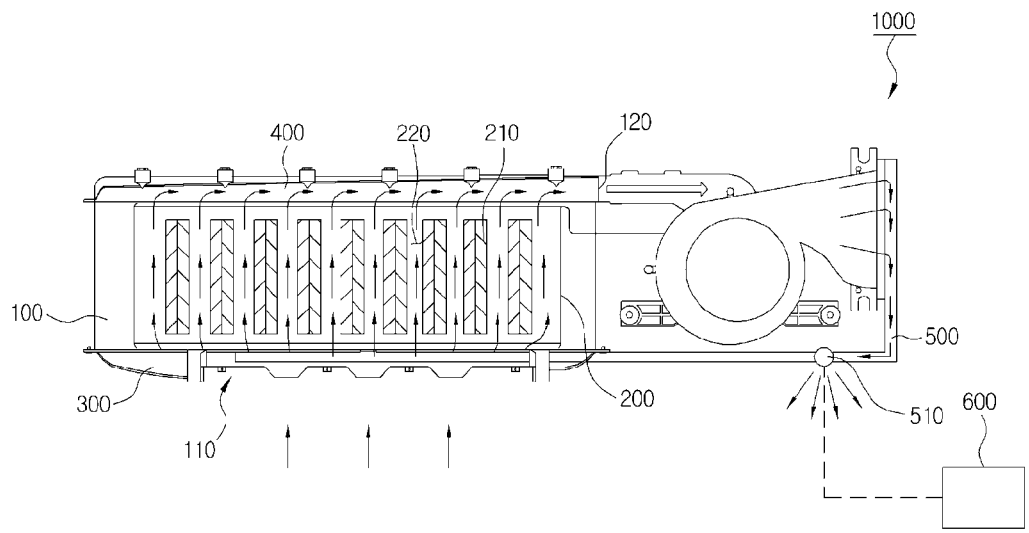
FIG. 1 is a perspective view showing a battery pack according to an exemplary embodiment of the present invention and a flowing view of air in a state in which an opening and closing valve is closed.
Figure 2:
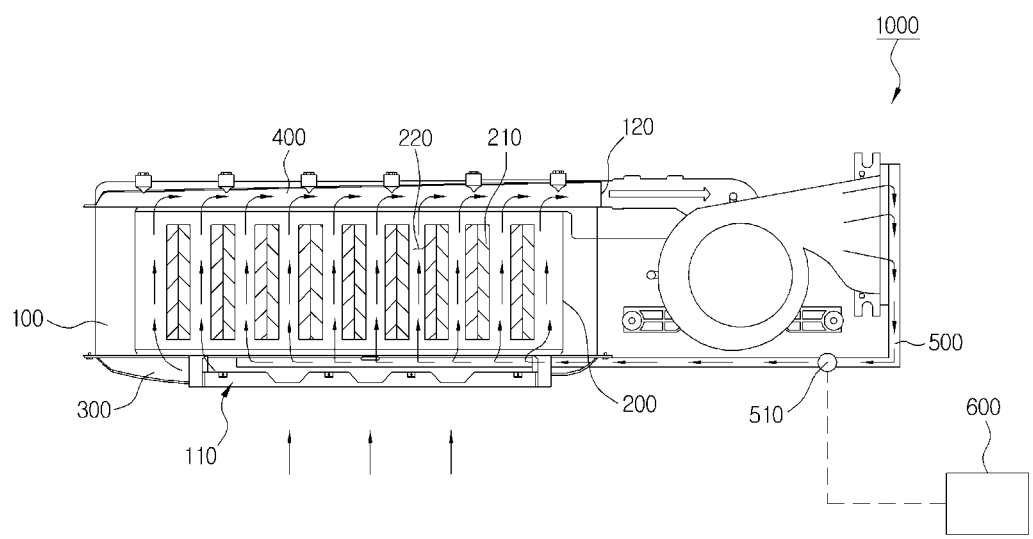
FIG. 2 is a perspective view showing a battery pack according to an exemplary embodiment of the present invention and a flowing view of air in a state in which an opening and closing valve is opened.

FIG. 1 is a perspective view showing a battery pack 1000 according to an exemplary embodiment of the present invention and a flowing view of air in a state in which an opening and closing valve 510 is closed and FIG. 2 is a perspective view showing a battery pack 1000 according to an exemplary embodiment of the present invention and a flowing view of air in a state in which an opening and closing valve 510 is opened. The battery pack 1000 according to the exemplary embodiment of the present invention will be described in detail with reference to FIGS. 1 and 2.

The battery pack 1000 according to the exemplary embodiment of the present invention includes a case 100, a cell module 200, an inhalation duct 300, an exhaust duct 400, and a circulation flow path 500.

The case 100 has a space part formed therein, one side which is opened, and an inhalation port 110 and an exhaust port 120 formed therein. In this case, in the case 100, it is also preferable to form each of the inhalation port 110 and the exhaust port 120 on different surfaces of the case 100. This forms directions in which cooling air is inhaled and exhausted to be different by forming each of the inhalation port 110 and the exhaust port 120 on the different surfaces of the case 100. This is to prevent the cooling air from being indiscriminately mixed again into the inhalation port 110, wherein the cooling air is inhaled into the inhalation port 110, cools a plurality of battery cells 210 while passing through the cell module 200, and is then exhausted to the exhaust port 120.

In addition, the inhalation port 110 may be formed to be perpendicular to a flowing direction of the cooling air which passes through a cooling channel 220 formed between the plurality of battery cells 210 of the cell module 200. That is, the inhalation port 110 is formed to be close to the cooling channel 220, which is a space formed between the plurality of battery cells 210 and is formed so as to be perpendicular to the flowing direction of the cooling air which passes through the cooling channel 220, such that the inhalation duct 300 connecting the inhalation port 110 and the cell module 200 to each other may be configured so as to have a short length and not to be bent. This may reduce flow resistance of the cooling air which is inhaled into the inhalation port 110 and may smoothly perform the inhalation of the cooling air into the cooling channel 220, thereby making it possible to improve cooling performance of the battery pack 1000.

The cell module 200 is accommodated in the case 100, and the cell module 200 has the plurality of battery cells 210 which are arranged in parallel to each other while having a predetermined distance to form the cooling channel 220 so that the cooling air may flow between the plurality of battery cells 210.

The inhalation duct 300 has one side connected to the inhalation port 110 so that external air is in communication with an interior of the case 100 through the inhalation port 110, and the other side which is opened toward the cooling channel 220 side to introduce air from the outside. The exhaust duct 400 has one side connected to the exhaust port 120 so that air having a temperature increased by cooling the cell module 200 is in communication with the interior of the case 100 through the exhaust port 120, and the other side which is opened toward the cooling channel 220 side, where both the inhalation duct 300 and the exhaust duct 400 are formed in a pipe shape.

The circulation flow path 500 connects the inhalation duct 300 and the exhaust duct 400 to each other, where one side thereof is connected to one side of the inhalation duct 300 and the other side thereof is connected to the entire exhaust port 120 connected to an end portion of the exhaust duct 400. That is, the inhalation duct 300 enables a portion of the exhaust air introduced through the circulation flow path 500 and the external air to be mixed and air having an optimal temperature for cooling the battery cell 210 to be introduced into the inhalation port 110.

In addition, FIGS. 1 to 3 show a case in which one side of the circulation flow path 500 is connected to a side of the inhalation duct 300, and a position that the circulation flow path 500 is connected to the inhalation duct 300 may be variously varied without departing from the scope of the present invention.

Therefore, the external air introduced into the inhalation port 110 passes through the inhalation duct 300, flows along the cooling channel 220 formed between the plurality of battery cells 210 configuring the cell module 200, passes through the exhaust duct 400, and is introduced into the circulation flow path 500, and a portion of the exhaust air introduced into the circulation flow path 500 is again introduced into the inhalation duct 300, and the remaining is exhausted to the outside.

That is, an air-cooling structure is formed in which the cooling air passes through the cooling channel 220 formed between the battery cells 210 and cools heat generated in a charging and discharging process of the battery cell 210.

In addition, the battery pack 1000 according to the exemplary embodiment of the present invention further includes an opening and closing valve 510 on the circulation flow path 500. FIGS. 1 and 2 show a flow of air according to a state of the opening and closing valve 510, and FIG. 3 is a schematic view showing an operation of the opening and closing valve 510. The operation of the opening and closing valve 510 will be described in more detail with reference to FIGS. 1 to 3.

Figure 3A:
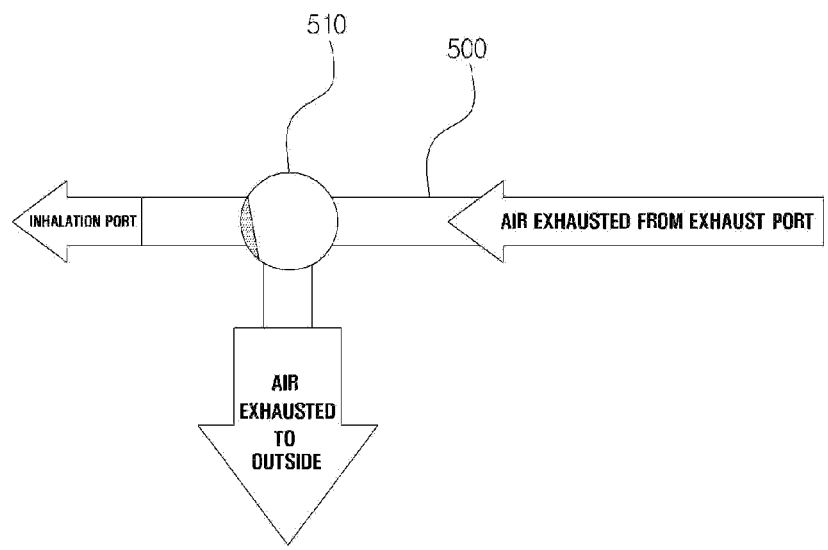
FIG. 3 is a schematic view showing an operation of the opening and closing valve of the battery pack according to the exemplary embodiment of the present invention.

FIG. 1 shows an air flow in a state in which the opening and closing valve 510 is closed and FIG. 3A is a schematic view showing an operation of a state in which the opening and closing valve 510 is completely closed to a side of the inhalation duct 300. As shown in FIGS. 1 and 3A, in the case in which the side of the inhalation duct 300 of the opening and closing valve 510 is completely closed and an external exhaust side is completely opened, the exhaust air cooling the battery cells 210 and passing through the exhaust duct 400 is transferred through the circulation flow path 500 and is all exhausted to the outside through the opening and closing valve 510.

Figure 3B:
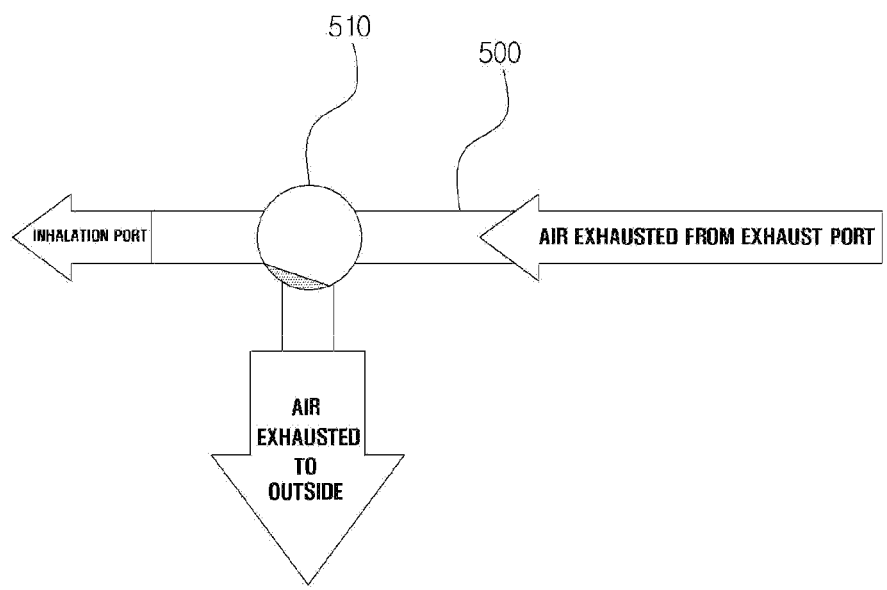

FIG. 2 shows an air flow in a state in which the opening and closing valve 510 is completely opened to the side of the inhalation duct 300 and FIG. 3B is a schematic view showing an operation of a state in which the opening and closing valve 510 is opened. As shown in FIGS. 2 and 3B, in the case in which the side of the inhalation duct 300 of the opening and closing valve 510 is completely opened and an exhausted side is completely closed, the exhaust air cooling the battery cells 210 and passing through the exhaust duct 400 is transferred through the circulation flow path 500 and is again introduced into the inhalation duct 300.

That is, FIG. 3A shows an operation in which all exhaust air is exhausted to the outside in the state in which the opening and closing valve 510 completely closes the side of the inhalation duct 300 and completely opens the side of the external exhaust side at the same time, and FIG. 3B shows an operation in which all exhaust air is again introduced into the inhalation duct 300 in the state in which the opening and closing valve 510 completely opens the side of the inhalation duct 300 and completely closes the side in which air is exhausted to the outside.

In addition, the opening and closing valve 510 opens a portion of the side of the inhalation duct 300 and closes a portion thereof, and opens a portion of the side in which air is exhausted and closes a portion thereof at the same time, according to a control, thereby making it possible to control a temperature of the introduced cooling air.

The battery pack 1000 according to the exemplary embodiment of the present invention further includes a controlling part 600 for controlling the opening and closing valve 510, where the controlling part 600 is controlled according to an opening and closing valve controlling method.

Figure 4:
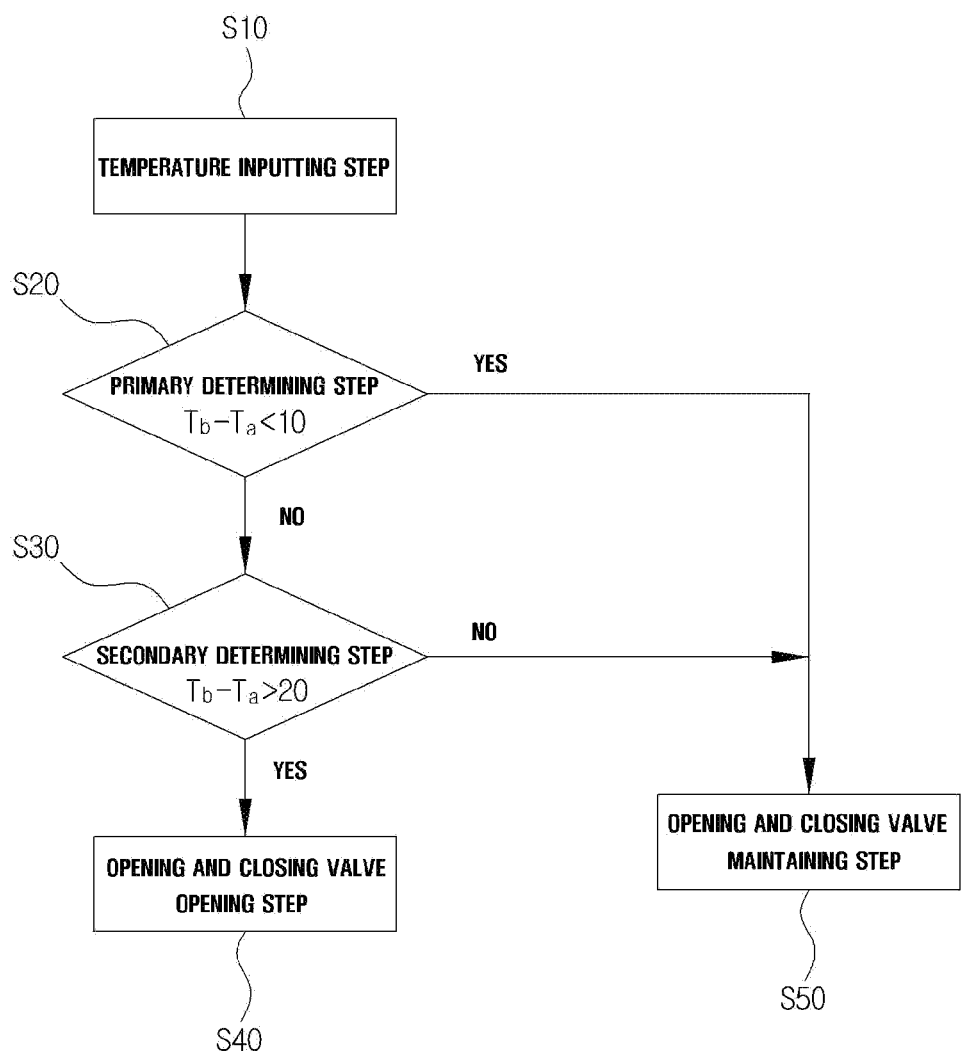
FIG. 4 is a flow chart showing a control method of a controlling part of the battery pack according to the exemplary embodiment of the present invention.

FIG. 4 shows a flow chart of an opening and closing valve controlling method of controlling the opening and closing valve 510 of the battery pack 1000 according to the exemplary embodiment of the present invention, and the opening and closing valve controlling method according to the exemplary embodiment of the present invention will be described in detail with reference to FIG. 4.

The opening and closing valve controlling method includes a temperature inputting operation (S10), a primary determining operation (S20), a secondary determining operation (S30), an opening and closing valve opening operation (S40), and an opening and closing valve maintaining operation (S50).

The temperature inputting operation (S10) is an operation in which a temperature Ta of external air and a temperature Tb of the cell module 200 are input to the controlling part 600, and the controlling part 600 performs the primary determining operation (S20) based on temperature information input from the temperature inputting operation (S10). The primary determining operation (S20) is an operation in which it is determined whether or not a difference between the temperature Ta of the external air and the temperature Tb of the cell module 200 is less than 10° C. As a result of the primary determining operation (S20), if the temperature difference (Tb—Ta) is less than 10° C., the opening and closing valve maintaining operation (S50) maintaining the opening and closing valve 510 to an original state is performed. As a result of the primary determining operation (S20), if the temperature difference (Tb—Ta) is 10° C. or more, the secondary determining operation (S30) is performed.

The secondary determining operation (S30) is an operation in which the temperature information after the primary determining operation (S20) is re-determined, and is an operation in which it is determined whether or not the difference between the temperature Ta of the external air and the temperature Tb of the cell module 200 exceeds 20° C. As a result of the secondary determining operation (S30), if the temperature difference (Tb—Ta) exceeds 20° C., the opening and closing valve opening operation (S40) opening the opening and closing valve 510 is performed and if the temperature difference (Tb—Ta) is 20° C. or less, the opening and closing valve maintaining operation (S50) is performed.

In this case, the opening in the opening and closing valve opening operation (S40) refers to a case opening the side of the inhalation duct 300 of the opening and closing valve 510, and the opening and closing valve maintaining operation (S50) refers to a case maintaining a state in which the side of the inhalation duct 300 of the opening and closing valve 510 is completely closed, which is an initial state. That is, the opening and closing valve opening operation (S40) performed according to the opening and closing valve controlling method opens the opening and closing valve 510 by 10% from the initial state. Therefore, in the case in which the opening and closing valve opening operation (S40) is performed once, the side of the inhalation duct 300 is opened by 10% and the side of the external exhaust side is closed by 10% at the same time.

The controlling part 600 gradually controls the temperature of the cooling air inhaled into the battery pack 1000 by continuously performing the opening and closing valve controlling method, whereby degradation of performance of the battery pack 1000 at a low temperature may be prevented.

The present invention is not limited to the above-mentioned embodiments but may be variously applied, and may be variously modified by those skilled in the art to which the present invention pertains without departing from the gist of the present invention claimed in the claims.

DETAILED DESCRIPTION OF MAIN ELEMENTS

1000: battery pack
100: case
110: inhalation port
120: exhaust port
200: cell module
210: battery cell
220: cooling channel
300: inhalation duct
400: exhaust duct
500: circulation flow path
510: opening and closing valve
600: controlling part
S10~S50: opening and closing valve controlling method

The invention claimed is:

1. A battery pack, comprising:
a case having an inhalation port opened to outside and an exhaust port formed therein, the inhalation port always being opened to inhale external air into the case;
a cell module included in the case and configured by arranging a plurality of battery cells in parallel to each other while having a predetermined distance;
an inhalation duct having one side connected to the inhalation port and the other side opened toward the cell module side;
an exhaust duct having one side connected to the exhaust port and the other side opened toward the cell module side;
a circulation flow path connecting the inhalation duct and the exhaust duct to each other;
a valve disposed in the circulation flow path between the exhaust duct and the inhalation duct, the valve being configured to regulate an amount of exhaust air passing through the circulation flow path from the exhaust duct to the inhalation duct and an amount of exhaust air directed from the exhaust duct to an outside of the battery pack; and
a controlling part controlling opening and closing of the valve based on a difference between a temperature of the cell module and a temperature of external air,
wherein the inhalation port is formed to be close to cooling channels formed between the plurality of battery cells of the cell module, and
wherein the inhalation duct is connected to the inhalation port and the circulation flow path such that the external air inhaled into the inhalation port and the exhaust air passing through the circulation flow path to the inhalation duct are mixed in the inhalation duct.

2. The battery pack of claim 1, wherein the controlling part does not open the valve if the difference between a temperature of the cell module and a temperature of external air which is inhaled into the inhalation port is less than 10° C.

3. The battery pack of claim 1, wherein the controlling part opens the valve if the difference between a temperature of the cell module and a temperature of external air which is inhaled into the inhalation port exceeds 20° C.

4. The battery pack of claim 1, wherein the valve is configured to open and close gradually to regulate the amount of exhaust air passing through the circulation flow path to the inhalation duct and the amount of exhaust air directed to the outside of the battery pack according to a degree of opening of the valve so that a temperature of cooling air flowing into the cell module is varied according to the degree of opening of the valve.

5. The battery pack of claim 4, wherein the external air introduced into the inhalation port and the exhaust air passing through the circulation flow path to the inhalation duct are mixed in the inhalation duct depending on the degree of opening of the valve.

6. The battery pack of claim 5, wherein the controlling part gradually opens the valve by 10% of full opening.

7. A battery pack, comprising:
 a case having an inhalation port opened to outside and an exhaust port formed therein, the inhalation port always being opened to inhale external air into the case;
 a cell module included in the case and configured by arranging a plurality of battery cells in parallel to each other while having a predetermined distance;
 an inhalation duct having one side connected to the inhalation port and the other side opened toward the cell module side;
 an exhaust duct having one side connected to the exhaust port and the other side opened toward the cell module side;
 a circulation flow path connecting the inhalation duct and the exhaust duct to each other;
 a valve disposed in the circulation flow path between the exhaust duct and the inhalation duct, the valve being configured to regulate an amount of exhaust air passing through the circulation flow path from the exhaust duct to the inhalation duct and an amount of exhaust air directed from the exhaust duct to an outside of the battery pack; and
 a controlling part controlling opening and closing of the valve based on a difference between a temperature of the cell module and a temperature of external air,
 wherein the controlling part does not open the valve if the difference between a temperature of the cell module and a temperature of external air which is inhaled into the inhalation port is below a first determined temperature, and the controlling part opens the valve if the difference between a temperature of the cell module and a temperature of external air which is inhaled into the inhalation port exceeds a second determined temperature,
 wherein the inhalation port is formed to be close to cooling channels formed between the plurality of battery cells of the cell module, and
 wherein the inhalation duct is connected to the inhalation port and the circulation flow path such that the external air inhaled into the inhalation port and the exhaust air passing through the circulation flow path to the inhalation duct are mixed in the inhalation duct.

8. The battery pack of claim 7,
 wherein the valve is configured to open and close gradually to regulate the amount of exhaust air passing through the circulation flow path to the inhalation duct and the amount of exhaust air directed to the outside of the battery pack according to a degree of opening of the valve so that a temperature of cooling air flowing into the cell module is varied according to the degree of opening of the valve, and
 wherein the external air introduced into the inhalation port and the exhaust air passing through the circulation flow path to the inhalation duct are mixed in the inhalation duct depending on the degree of opening of the valve.

9. The battery pack of claim 8, wherein the controlling part gradually opens the valve by 10% of full opening.

* * * * *